Oct. 31, 1933.   H. F. FLOWERS   1,933,211
SYSTEM AND APPARATUS FOR TRANSPORTING SHIPPING CONTAINERS
Filed Dec. 15, 1931   4 Sheets-Sheet 3
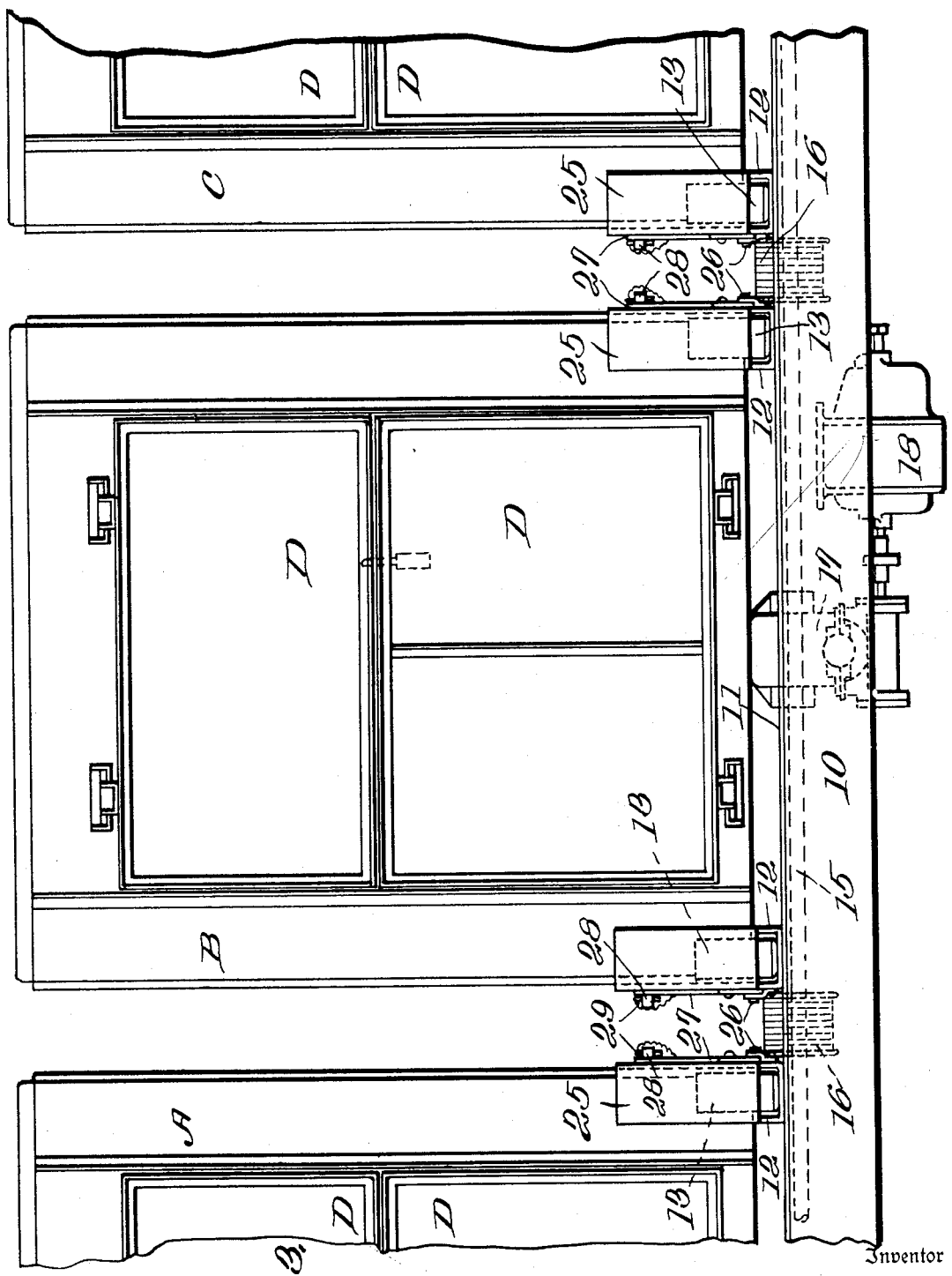
Inventor
HENRY FORT FLOWERS
By
Attorneys

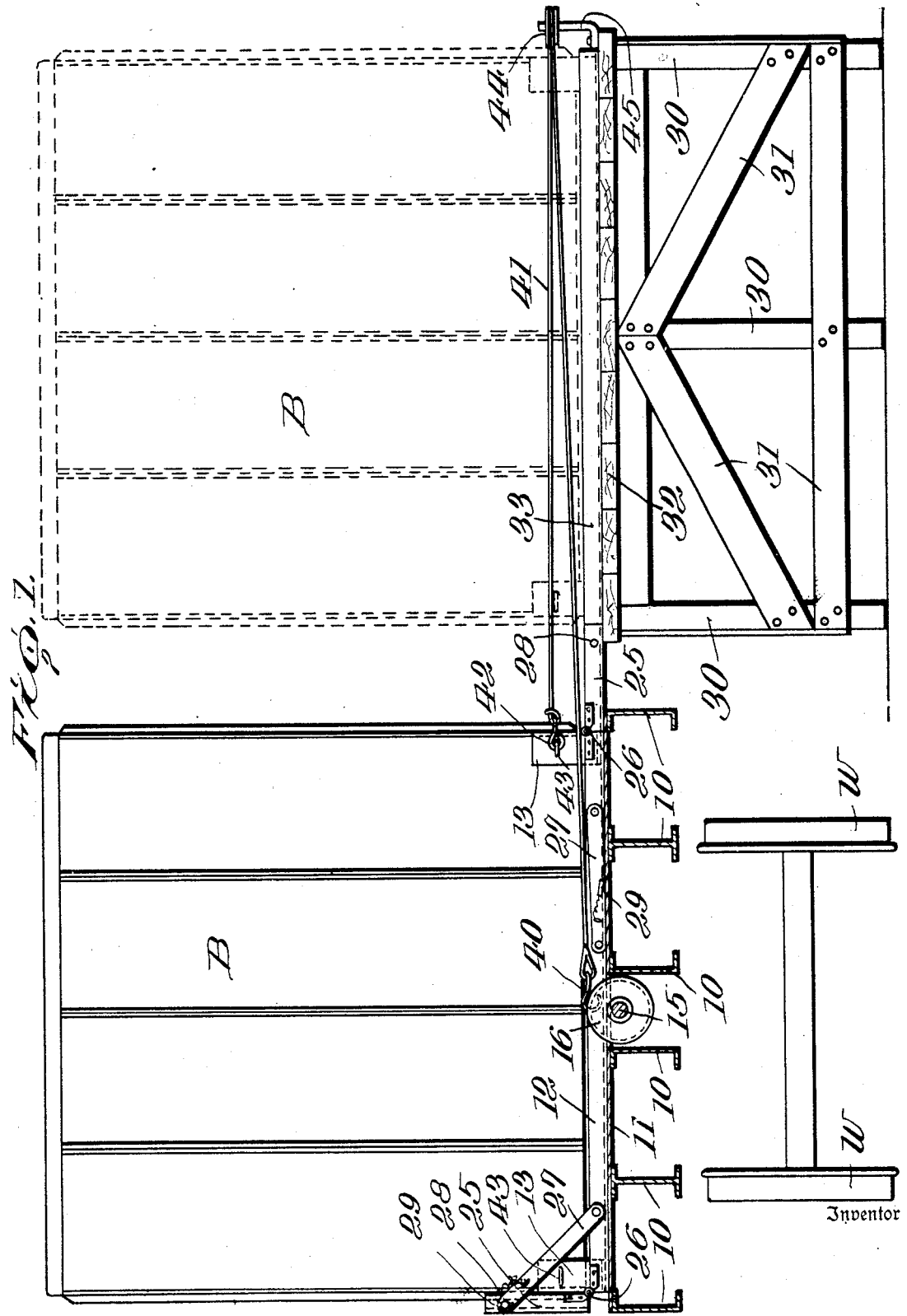

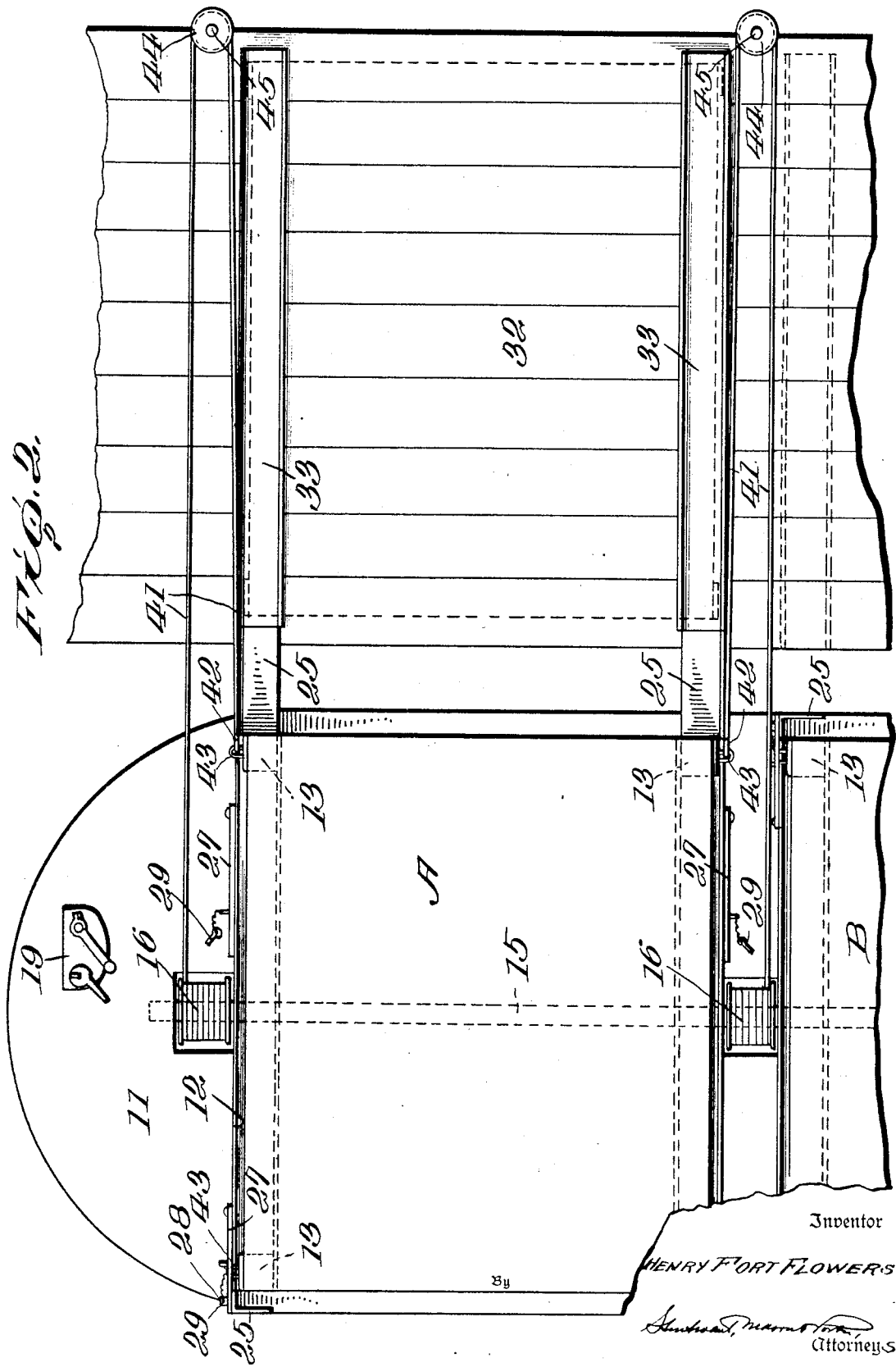

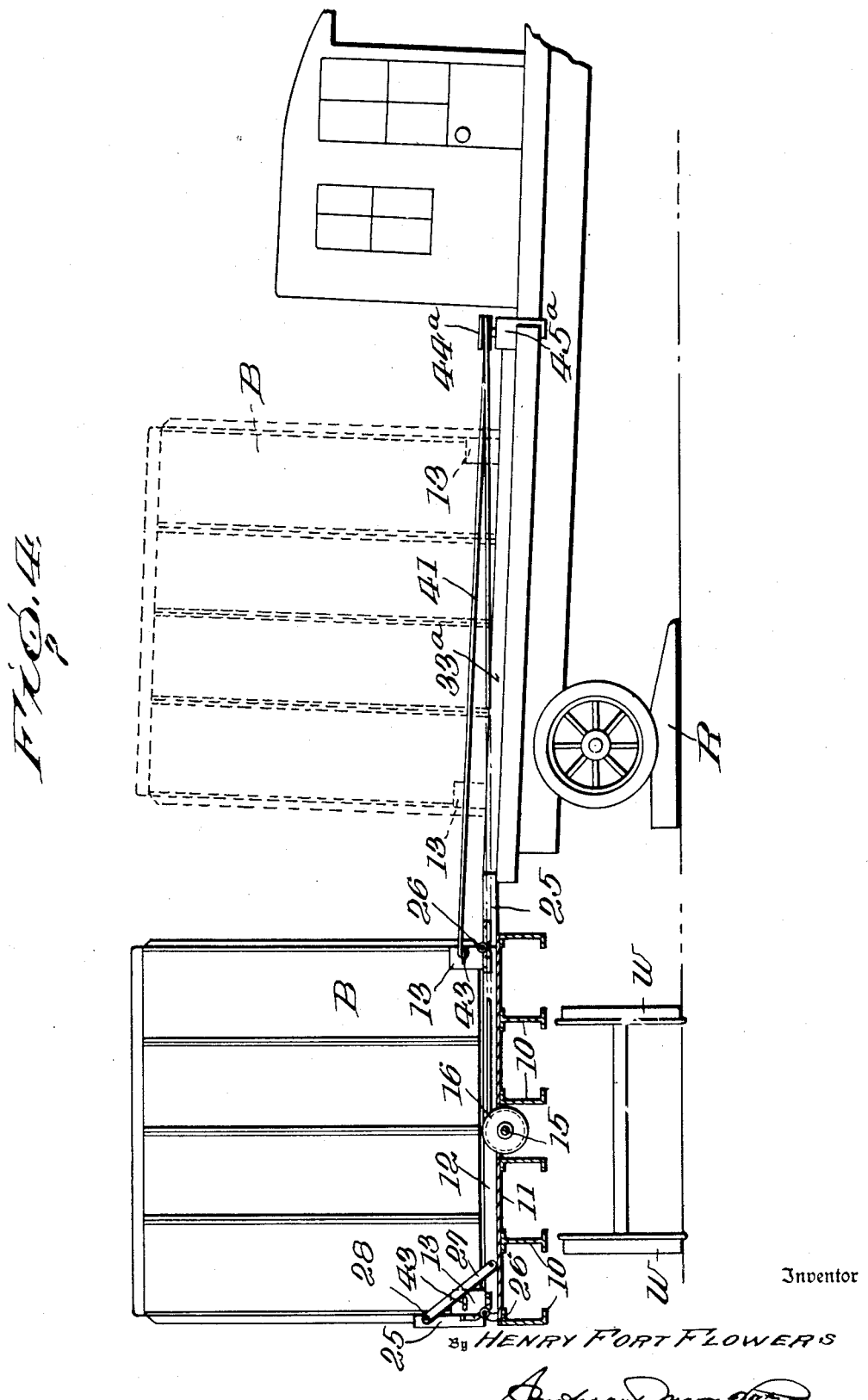

Patented Oct. 31, 1933

1,933,211

UNITED STATES PATENT OFFICE 1,933,211

SYSTEM AND APPARATUS FOR TRANSPORTING SHIPPING CONTAINERS

Henry Fort Flowers, Findlay, Ohio

Application December 15, 1931
Serial No. 581,235

4 Claims. (Cl. 214—65)

This invention relates to improvements in equipment by which interchangeable individual containers may be charged with merchandise, placed upon transport vehicles, hauled thereon to a predetermined discharge point, and then removed therefrom for discharging, whereby the haulage vehicles are made free for travel with other containers.

One of the features of the present invention is the provision of a haulage vehicle adapted to receive one or more containers and including mechanism whereby these containers may be shifted to and from the vehicle.

Another feature of the present invention is the provision of means on such a vehicle for holding the container or containers in position thereon, such means being utilizable also as a bridge for the sliding of a container to and from the vehicle.

Still another feature of the present invention is the provision of a vehicle having a plurality of devices thereon which may be employed selectively for the moving of one or another container from and to the vehicle.

A further feature of the invention is the provision of a bridge piece which may be employed as a pathway for the travel of the container to and from the vehicle, and which operates in compression between the vehicle and the structure with respect to which the container is to be shifted, so that relative rocking and tilting of these, by reason of the strains occasioned in moving the container, are avoided.

With these and other objects in view as will appear in the course of the following specification and claims, an illustrative form of practicing the invention is set forth on the accompanying drawings, by way of example.

In these drawings:—

Figure 1 is a side elevation on a vertical plane transversely to the longitudinal axis of the vehicle showing the relationship of the vehicle to a stationary platform during the movement of the container to and from the vehicle.

Figure 2 is a corresponding plan view.

Figure 3 is a fragmentary side elevation of the vehicle with containers thereon.

Figure 4 is a view corresponding to Figure 1 but showing the operation of transporting a container from a rail vehicle to a road vehicle.

In Figures 1 to 3 of the drawings, the vehicle is illustrated as being a rail car adapted for use on an electric railway in which a source of electric power is available, but it will be understood that this is not essential to the practicing of the invention.

The car is shown as comprising the wheels W which in some proper manner (not shown) support the longitudinal sills 10 of the car. These sills carry a floor 11 upon which are provided, at properly spaced intervals and arranged transversly of the car, the channel irons 12 which serve as slideways for the containers. In the illustrated form, these slideways are arranged in pairs and are spaced apart a distance corresponding to the spacing of the feet of the containers. In the drawings, the containers are illustrated as being of the type described and claimed in my co-pending application Serial No. 572,158, filed Oct. 30, 1931. The containers A, B and C have the necessary side, end and top walls, and floor, together with the doors D, D so that they may be closed during transport. Each of these containers likewise is provided with the four corner posts 13 at the bottom corners, which rest in the channels 12 and may be slid thereon to and from the car.

Between the two center sills 10, below the car floor 11, is arranged a longitudinally extending shaft 15 which extends substantially from one end of the car to the other and is provided between the locations for each two containers with a windlass 16. An electric motor 18 is mounted beneath the car, and may be supplied with current for example from a controller box 19 (Figure 2) on the under platform of the car, and is coupled by a reduction gear 17 to the shaft 15. The speed of the motor and its direction of travel may thus be regulated, and an attendant can cause the windlass to move in the proper direction as he may desire.

When the containers are located on the car, they are held in position against longitudinal movement on the car by the engagement with the channels 12, and against transverse movement by the bridge-posts 25 which are mounted by pivots 26, at their lower ends, on the channels 12. Swinging arms 27 likewise pivoted to the channel pieces 12 may be engaged with pins 28 on the bridge-posts 25, and held thereto by pins 29, so that a rigid structure is provided during normal transport and movement of the car. Upon arriving at a discharge point, for example, the pin 29 may be disengaged and the link 27 removed from the pin 28. The bridge-post 25 may now be rocked downwardly until it extends in prolongation of the channel iron 12 and furnishes a slideway upon which the corresponding corner posts 13 of the container may move (right hand side of car in Figure 1).

In Figures 1 and 2, a stationary or trackside platform is shown as comprised of posts 30 with proper brace members 31 for structural strength and a platform 32 thereon supporting pairs of channel irons 33 which are likewise spaced at the proper distances corresponding to the spacing of the feet 13 of the containers. From Figure 1, it will be noted that, when the bridge posts 25 are swung down, they fill the space between the channels 12 on the car and the channels 31 on the platform, the platform members being located at a proper distance from the rails for this purpose. Hence the bridge-posts 25 may operate in compression for preventing rocking movement of the car and platform relative to one another.

When the car has been brought to the proper position relative to the platform and its channels 33 (Figure 2), the attendants engage the hooks 40 of a pair of cables 41 over the windlasses 16 which are located at either end of the container to be moved. The hooks 42 at the other end of the cables 41 are engaged around the eyes 43 on the corner posts 13 of the container, while the cables 41 themselves are brought around the sheaves 44 which are supported by brackets 45 on the platform. The control box 19 is then operated to cause the rotation of the motor 18 and therewith of the shaft 15 in the proper direction for winding the cables 41 upon the windlasses 16. The traction thus afforded causes the motor 18, as a source of power located upon the vehicle itself, to draw the container forward along the channels 12, over the bridge-posts 25 and onto the channels 33 on the platform. It will be noted that the employment of draft devices, comprising the cables 41 and associated parts, at each end of the container, and the uniform pulls upon these draft devices by the windlasses 16, will cause a smooth translation of the container from the car to the platform.

The container may then be transferred to another vehicle or may be opened upon the platform and its contents discharged. It may likewise be loaded thereat.

When it is desired to return the container to the car, the cables 41 are engaged by their hooks 40 with the windlasses 16 as before, but preferably the controller box 19 is operated to shorten the free lengths of the cables. The hooks 42 at the free ends of the cables are then engaged with the eyes 43 located at the far side of the platform, and the cables are not passed around the sheaves 44, so that upon further actuation of the motor 18 through controller box 19, the container is drawn smoothly along the channels 33, the bridge-posts 25, and the channel members 12 of the car until it is close against the upright and latched bridge-posts 25 on the far side of the car. The bridge-posts 25 which have been employed as a connecting rail may then be raised and secured as before, to prevent transverse shifting of the container while the car is traveling. It will be noted that the containers are slid onto and off from the car along the same channel members which prevent their shifting in the longitudinal direction of the car during travel and that the containers are held against transverse shifting on the car by the bridge-posts which constitute a sliding means during loading and unloading.

The car may also be employed for discharging onto the channels 33a provided on the floor 50 of a truck (Figure 4), without the employment of the trackside platform at all. As a further modification, the sheaves 44a are shown as carried by the portable brackets 45 which are similarly clipped over the edge of the truck platform, and may be removed therefrom and carried along with the car, so that in effect the car may carry with it all that is necessary for its own loading and unloading.

When the transportation system is employed in conjunction with vehicles having container supports at different levels, as for example in the case of a railway car and a truck, as shown in Figure 4, the system includes means whereby the support levels may be adjusted with respect to one another, as for example by the provision of the ramp R in Figure 4 by which the rear end of the truck may be elevated until it is in proper alignment to provide a smooth pathway from the channels on the car, along the bridge members 25, and onto the channels 33a of the truck, or vice versa.

It is obvious that many other changes may be made in the construction employed, without departing from the scope of the appended claims.

Having thus described my invention, what I claim as new and desire to secure by Letters Patent, is:

1. In a vehicle for transporting a plurality of containers, a source of power, a plurality of means actuated by said source for moving said containers, at least one of said actuated means being located between two of said containers, and devices for connecting a plurality of said actuated means to a selected one of said containers at points thereof spaced at right angles to the direction of sliding movement to be given the container and operating for sliding the container to and from its transport position on said vehicle when said source of power is energized, the device associated with said one actuating means being selectively engageable with either of the adjacent containers.

2. In a vehicle for transporting a plurality of containers, a source of power, a plurality of windlasses driven from said source of power, a plurality of longitudinally spaced transverse guide means on said vehicle for supporting said containers, at least one of said windlasses being located in the space between the guide means of two containers, and cables for selectively connecting a plurality of said windlasses to a selected one of said containers at points thereof spaced from one another in the longitudinal direction of the vehicle, whereby the windlasses and source of power may operate to slide the container along said guide means with respect to the vehicle.

3. In a vehicle for transporting a plurality of containers, a source of power, a shaft extending longitudinally of said vehicle, a plurality of windlasses on said shaft and spaced longitudinally of the vehicle, container guiding supports on said vehicle between each two of said windlasses, and cables for connecting any two adjacent said windlasses to a container alined with respect to the support between them, so that said container may be moved onto and off from its said support.

4. In a transport vehicle for a plurality of independent containers of predetermined dimensions, a source of power, a longitudinally extending shaft driven by said source of power, a plurality of longitudinally spaced windlasses driven by said shaft, a plurality of longitudinally spaced transversely extending guide means on said vehicle whereby to support a said container between each two of said windlasses, cable devices connectible with the containers and operable by said windlasses whereby to slide the containers along said guide means, each cable associated with a windlass located between two said container guides being selectively connectible with one or the other of containers alined with respect to said two guide means, and means for preventing transverse movement of said containers while on said vehicle, said movement preventing means including devices which may be moved during discharging into position to permit the sliding thereover of the corresponding containers from and to the vehicle.

HENRY FORT FLOWERS.